US006595083B2

(12) United States Patent
Hosoi et al.

(10) Patent No.: US 6,595,083 B2
(45) Date of Patent: Jul. 22, 2003

(54) STEERING WHEEL

(75) Inventors: Akio Hosoi, Komaki (JP); Atsushi Nagata, Inazawa (JP)

(73) Assignee: Toyoda Gosei, Co., Ltd., Aicki-ken (JP)

( * ) Notice: Subject to any disclaimer, the term of this patent is extended or adjusted under 35 U.S.C. 154(b) by 0 days.

(21) Appl. No.: 10/067,767

(22) Filed: Feb. 8, 2002

(65) Prior Publication Data

US 2002/0083790 A1 Jul. 4, 2002

Related U.S. Application Data

(62) Division of application No. 09/228,416, filed on Jan. 12, 1999, now Pat. No. 6,367,351, which is a division of application No. 08/795,793, filed on Feb. 5, 1997, now Pat. No. 5,855,145.

(30) Foreign Application Priority Data

| Jan. 13, 1998 | (JP) | ............................................ 10-004769 |
| Aug. 21, 1998 | (JP) | ............................................ 10-236140 |
| Aug. 21, 1998 | (JP) | ............................................ 10-236141 |
| Aug. 21, 1998 | (JP) | ............................................ 10-236142 |
| Aug. 21, 1998 | (JP) | ............................................ 10-236143 |

(51) Int. Cl.$^7$ ................................................. B62D 0/04

(52) U.S. Cl. ............................. 74/522; 403/12; 403/21

(58) Field of Search ....................... 74/552; 403/12, 403/21

(56) References Cited

U.S. PATENT DOCUMENTS

| 3,465,803 | A | * | 9/1969 | Ernest et al. ............... 411/349 |
| 4,565,464 | A | * | 1/1986 | Nilsson ...................... 403/290 |
| 4,624,596 | A | | 11/1986 | Eckendorff |
| 4,685,848 | A | | 8/1987 | Langer |
| 4,829,848 | A | | 5/1989 | Shinto et al. |
| 4,893,520 | A | | 1/1990 | Endo et al. |
| 4,934,888 | A | * | 6/1990 | Corsmeier et al. .......... 411/107 |
| 4,955,744 | A | | 9/1990 | Barth et al. |
| 4,962,947 | A | | 10/1990 | Nagata et al. |
| 5,134,899 | A | | 8/1992 | Nagata et al. |
| 5,144,861 | A | | 9/1992 | Nishijima et al. |
| 5,253,949 | A | * | 10/1993 | Oxley et al. .................. 403/21 |
| 5,291,800 | A | | 3/1994 | Patzelt et al. |
| 5,336,028 | A | * | 8/1994 | Yamamoto .................. 403/21 |
| 5,356,173 | A | | 10/1994 | Hongou et al. |
| 5,617,763 | A | * | 4/1997 | Cymbal ....................... 74/552 |
| 5,816,113 | A | | 10/1998 | Fohl |
| 5,855,145 | A | | 1/1999 | Hosoi et al. |
| 5,941,131 | A | | 8/1999 | Fohl |
| 5,950,499 | A | | 9/1999 | Hosoi et al. |
| 6,041,677 | A | * | 3/2000 | Reh et al. ...................... 74/552 |

FOREIGN PATENT DOCUMENTS

| EP | 2-058-694 | 4/1981 |
| EP | 685 379 | 12/1995 |
| FR | 2614951 | 11/1988 |
| GB | 2102092 | 1/1983 |
| JP | 56-152769 | 4/1980 |
| JP | 60-60065 | 4/1985 |
| JP | 61-64079 | 5/1986 |
| JP | 61-257360 | 11/1986 |
| JP | 62-178469 | 8/1987 |
| JP | 63-240464 | 10/1988 |
| JP | 2-127571 | 10/1990 |

(List continued on next page.)

Primary Examiner—William C Joyce
(74) Attorney, Agent, or Firm—Posz & Bethards, PLC

(57) ABSTRACT

A steering wheel includes a boss for fastening the steering wheel to a steering shaft. Among other features, the steering wheel has a pair of lower spokes that are deformable to absorb energy in a collision. The boss conserves space and has relatively long splines for engaging the steering shaft. The boss includes a plate that facilitates insert molding and conserves space. The spokes include integrally formed airbag supports. A bolt retainer is included in the steering wheel. The bolt retainer holds a bolt for tightening the boss on the steering shaft, and the bolt retainer permits one-handed attachment.

6 Claims, 18 Drawing Sheets

FOREIGN PATENT DOCUMENTS

| | | |
|---|---|---|
| JP | 2-133955 | 11/1990 |
| JP | 4-95569 | 3/1992 |
| JP | 4-101768 | 9/1992 |
| JP | 5-37609 | 5/1993 |
| JP | 6-8785 | 1/1994 |
| JP | 7-257394 | 10/1995 |
| JP | 7-323843 | 12/1995 |
| JP | 8-40284 | 2/1996 |
| JP | 8-119119 | 5/1996 |
| JP | 8-192754 | 7/1996 |
| JP | 8-230681 | 9/1996 |
| JP | 8-230684 | 9/1996 |
| JP | 8-295260 | 11/1996 |
| JP | 9-240489 * | 9/1997 |
| JP | 9-240491 | 9/1997 |
| JP | 9-226600 | 11/1997 |
| JP | 10-16789 * | 1/1998 |
| JP | 10-100908 | 4/1998 |

* cited by examiner

STEERING WHEEL

This is a divisional application of Ser. No. 09/228,416 (now U.S. Pat. No. 6,367,351) which was filed on Jan. 12, 1999, which is a divisional application of Ser. No. 08/795,793, which was filed on Feb. 5, 1997 and is now U.S. Pat. No. 5,855,145, the contents of which are incorporated herein in their entirety by reference.

BACKGROUND OF THE INVENTION

A present invention relates to a steering wheel for vehicles.

Generally, a steering wheel includes an annular grip, spokes and a pad. The spokes extend from the grip towards the center of the steering wheel. The pad is located in the center of the grip ring. A metal grip core and a metal spoke core, which are made of magnesium alloy, are embedded in the grip and the spoke, respectively. A polyurethane layer covers the grip core and the spoke core. A boss including a boss body and a boss plate is connected to the spoke core below the pad by insert molding. The steering wheel is installed on the end of a steering shaft by engaging the boss with the steering shaft: The steering wheel is fixed by fastening a nut to threads on the end of the steering shaft.

In such steering wheels, when installing the steering wheel to the steering shaft, it is necessary to fasten the nut from above the boss. Accordingly, a pad that includes an airbag can not be attached on the cores in advance. The pad must be installed on the cores after the steering wheel is attached to the steering shaft.

On the other hand, it is known to employ a yoke-type boss, which is fixed to the steering shaft from the side by a bolt. The body of the yoke type boss includes a cylindrical portion with inner splines, which engage with outer splines on the steering shaft, and a C-shaped yoke portion, which is integrally formed with the cylindrical portion. Bolt holes are formed in facing parts of the yoke portion. At least one of the bolt holes has inner threads. A neck portion corresponding to the bolt holes is formed on the outer surface of the steering shaft.

After the boss is engaged with the steering shaft, a bolt is fastened in the bolt holes. Rotation of the steering wheel with respect to the steering shaft is prevented by engaging the splines of the boss with those of the steering shaft and by tightening the yoke portion with the bolt. The shaft of the bolt engages the neck portion, and axial movement of the steering wheel is also prevented.

When the yoke-type boss is used, a steering wheel assembly is installed on the steering shaft. The assembly includes the air bag device in the pad attached on the cores. Since the steering wheel is assembled before the installation, it can be transported as an assembly including the pad, which improves efficiency.

In the steering wheel assembly, the airbag device must be provided in the middle of the cores facing the driver. However, since the yoke-type boss is located in the center of the cores, supports for attaching the airbag device can not be formed in the center of the cores. This limits the formation of the airbag supports. It is necessary to make the airbag supports strong because, when the airbag is activated, a great load acts on the airbag supports. If the airbag supports are deformed when the airbag is activated, the air bag may not open in the proper direction.

Further, in the steering wheel assembly, fastening the bolt is troublesome. A worker must adjust the position of the bolt with one hand and tighten the bolt by a tool with another hand. Also, this work is done in a relatively small space, and the work takes time.

The weight of the steering wheel can be reduced by forming the cores by die casting using a light metal like magnesium. The light metal may also be aluminum or magnesium alloy. However, magnesium resists deformation. Thus, when a large load is applied to the steering wheel, the cores resist deformation. Deformation is desirable to absorb energy.

SUMMARY OF THE INVENTION

The boss will now be further described referring to FIG. 11. The boss 51 includes a cylindrical portion 52a, a boss body 52 having yoke 52b, and a boss plate 53. The boss plate 53 is welded to the cylindrical portion 52a of the boss body 52. A step-like bend 53a is formed on the boss plate 52. An insert portion 53b is on the rim of the boss plate 53 and is located toward the lower surface of the boss plate 53. When a metal core 56 is molded on the insert portion 53b of the boss plate 53 using molds 54, 55, the metal core 56 does not project forward of the lower surface of the boss plate 53.

Molten metal that flows in a cavity for molding the metal core 56 in the molds 54, 55 is subjected to high pressure, and there is a concern that the molten metal in the cavity might leak toward the boss 51, thus producing flash. Therefore, to prevent leakage of the molten metal, surfaces 55a, 54a of the inner margins of the molds 54, 55 contact the boss plate 53. In other words, the molds 54, 55 include anti-flash surfaces 54a, 55a.

However, since a bend 53a is formed on boss plate 53, the width W2 (as measured in the left to right direction of FIG. 11) of the anti-flash surfaces 54a, 55a is too small. Therefore, flash, which extends from the inner edges of the molds 54, 55, is not prevented completely.

An installation structure of a prior art boss will now be described with reference to FIG. 14. As shown in FIG. 14, a circular through hole 252 is formed on a boss plate 251. A lower end of the cylindrical portion 253a of the boss body 253 occupies the through hole 252. The boss plate 251 is welded to the cylindrical portion 253a of the boss body 253. The projection amount P2 of the boss body 253 rearward of the boss plate 251 (towards the airbag) is relatively large, and the boss body 253 thus interferes with the installation of an airbag device. The size of the steering wheel 11 also increases.

To solve this problem, it is possible for the boss body 253 to be further inserted forward in the through hole 252 of the boss plate 251 and then fixed by welding. In this way, the rearward projection amount of the boss body 253 from the boss plate 251 is reduced, and the size of the steering wheel is reduced. However, when the boss body 253 is further inserted in the through hole 252 of the boss plate 251, a slit 253c of a yoke portion 253b overlaps the weld bead 254. The part of boss body 253 with slit 253c is not uniformly deformed during welding, and strain is caused from welding. The length of the slit 253c may be shortened. However, if this were done, the axial length of the yoke portion would be shortened, and consequently the yoke portion 253b will not easily flex. Therefore, when a bolt is tightened in the bolt hole, the radius of the yoke portion 253b cannot be easily reduced. As a result, the steering wheel 11 may not be secured to the steering shaft 30.

A first objective of the present invention is to provide a steering wheel that has a strengthened airbag supports on the cores.

A second objective of the present invention is to provide a steering wheel formed by die casting and that absorbs energy when a predetermined load is applied.

A third objective of the present invention is to provide a steering wheel that makes the work of installing the steering wheel to the steering shaft faster and easier.

To achieve the above objectives, the present invention provides a steering connected to a distal end of a steering shaft with a boss, the steering wheel having a grip for rotating the steering shaft, the steering wheel comprising: a metal grip core embedded in the grip; a plurality of spokes that extend from the grip; a metal spoke core embedded in each spoke, wherein the spoke core is integrally molded with the grip core by die casting; a layer of material covering the grip core and the spoke core; a pad, which is located over the boss in the center of the grip; a cylindrical portion, which is part of the boss, wherein the cylindrical portion receives the distal end of the steering shaft, wherein the cylindrical portion is a part of the boss; a fastening mechanism for fastening the boss to the steering shaft, wherein the fastening mechanism is integrally formed with the cylindrical portion; a boss plate fixed to the cylindrical portion of the boss, wherein the boss plate includes a rim which is embedded in the spoke core, wherein the boss plate includes a deformable portion, which is deformed when a predetermined load is applied to the grip.

The present invention further provides a steering wheel connected to a distal end of a steering shaft with a boss, the steering wheel having a grip for rotating the steering shaft, the steering shaft comprising: a grip core embedded in the grip; a plurality of spokes extending from the grip core; a spoke core embedded in each spoke, the spoke cores being integrally molded with the grip core by die cast molding; an airbag device located behind the boss; and a pair of ribs formed on the spoke core, the cross section of the spoke core being U-shaped, wherein an airbag support for attaching the airbag device is integrally formed on at least one of the ribs.

The present invention provides a steering wheel connected to a distal end of a steering shaft with a boss, the steering wheel having a grip for rotating the steering shaft, the steering wheel comprising: a metal grip core embedded in the grip; a plurality of spokes that extend from the grip; a metal spoke core embedded in each spoke, wherein the spoke core is integrally molded to the grip core by die casting; a cylindrical portion, which is part of the boss, wherein the cylindrical portion receives the distal end of the steering shaft; a yoke integrally formed on the cylindrical portion, wherein the yoke has a pair of arms for fastening the boss to the steering shaft; a bolt hole provided in each arm of the yoke, a bolt occupying the bolt holes for fastening the arms of the yoke and fixing the steering wheel to the steering shaft; a neck formed in the steering shaft, wherein the bolt engages the neck; and a bolt retainer for holding the bolt, the bolt retainer being axially aligned with the bolt hole, wherein the bolt retainer temporarily retains the bolt in an initial position, wherein the distal end of the bolt is spaced from the neck portion and is located in the entrance of one of the bolt holes prior to installation of the steering wheel.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS (First Embodiment)

A first embodiment of the present invention will now be described in reference to FIGS. 1–14. In this specification, the top and bottom of a steering wheel 11 refer to the twelve o'clock and six o'clock positions, respectively. The front of the steering wheel is the side that faces the dashboard, and the rear side is the side that faces the driver.

Figure 1:
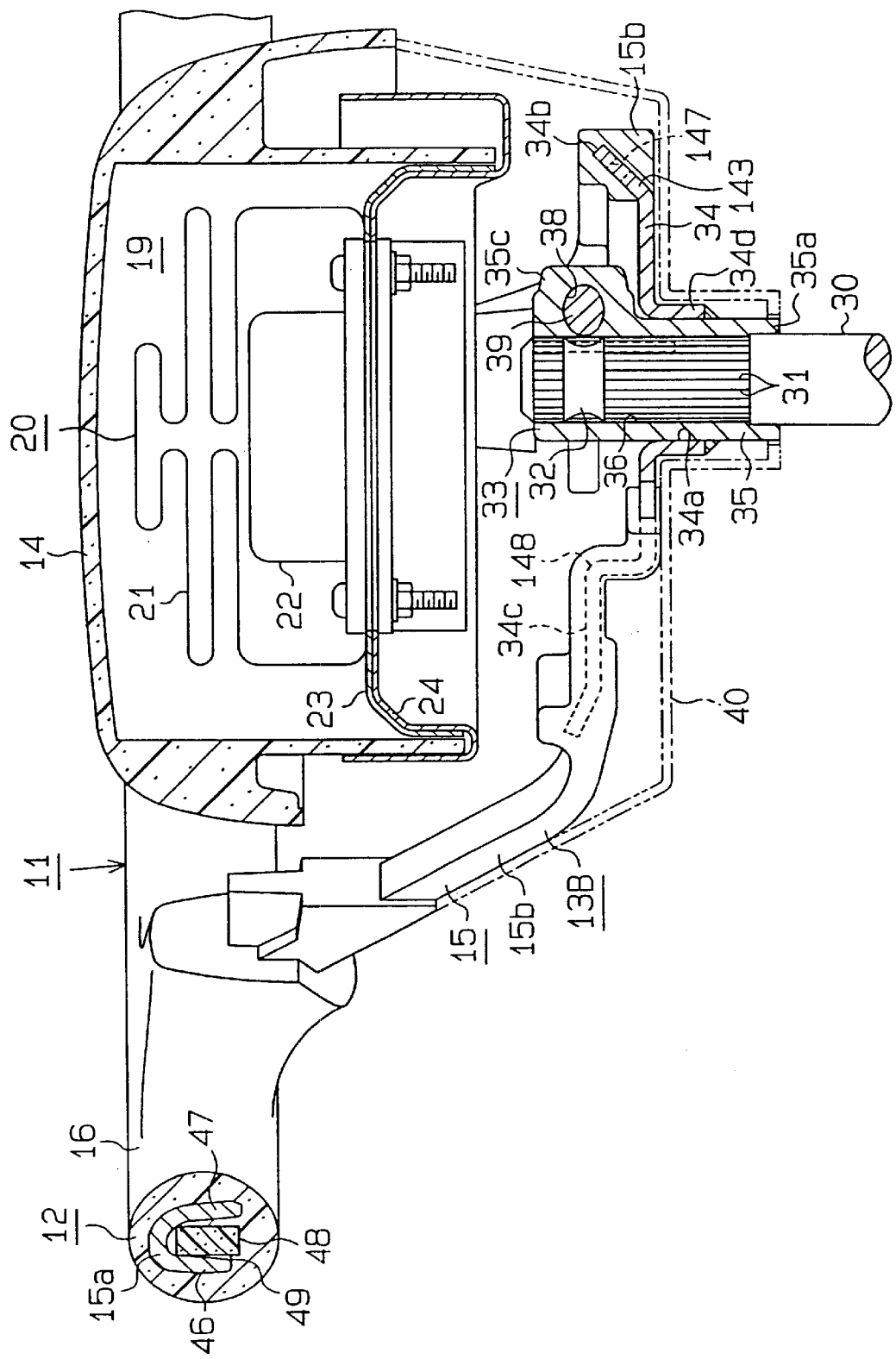
FIG. 1 is a cross-sectional view taken on line 1—1 of FIG. 3A showing a first embodiment of the present invention.
Figure 2:
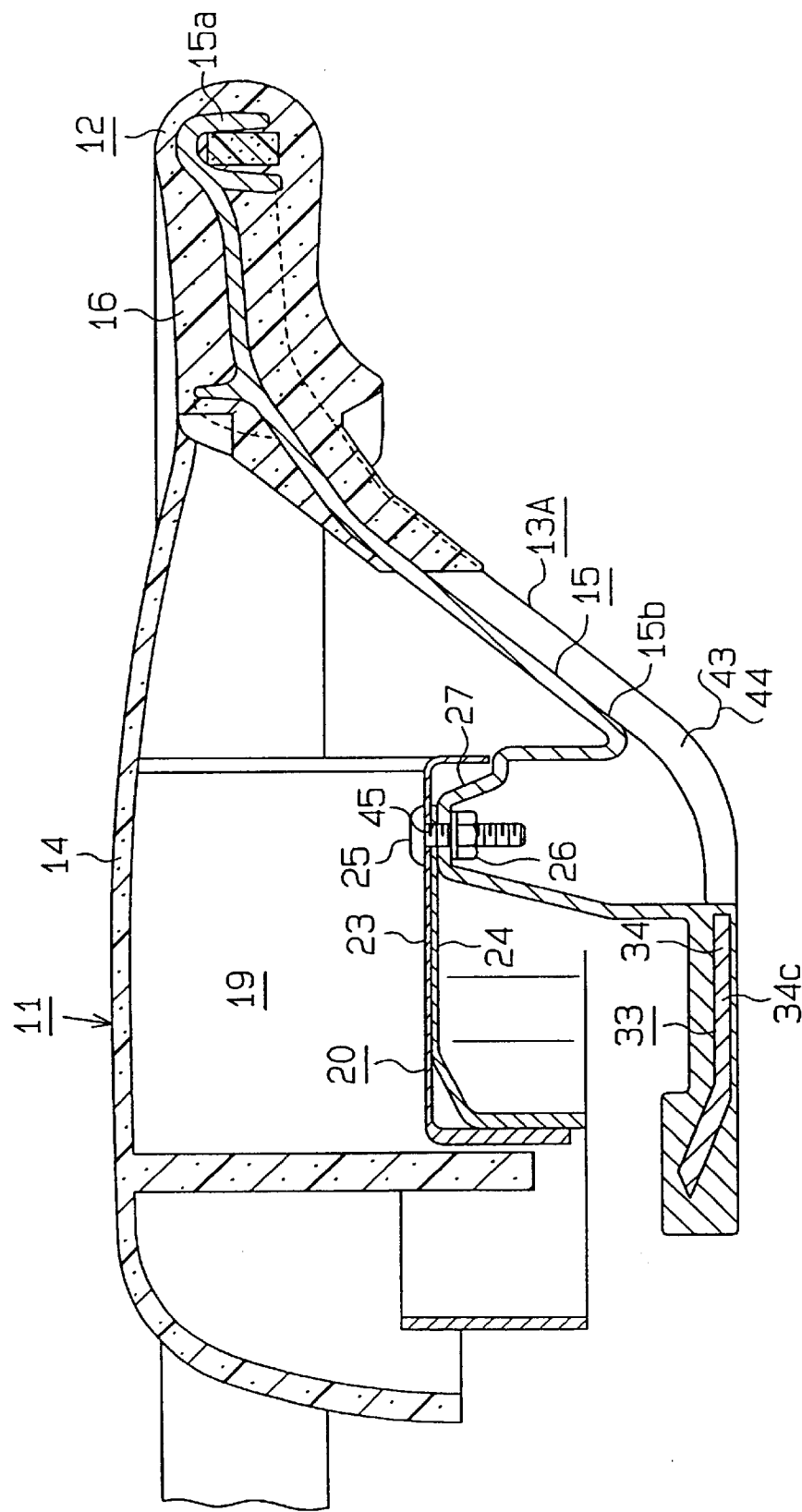
FIG. 2 is a cross-sectional view taken on line 2—2 of FIG. 3A.

As shown in FIGS. 1–3, the steering wheel 11 includes an annular grip 12, spokes 13A, 13B, and a pad 14. The spokes 13A, 13B extend from the grip 12 towards the center, and the pad 14 is located in the center of the grip 12. The number of the spokes 13A, 13B can be varied. The pad 14 is made of soft synthetic resin such as polyurethane foam.

A metal core 15, which includes a metal spoke core 15b and a metal grip core 15a, and a layer 16 covering the metal core 15 form the grip 12 and the spokes 13A, 13B. The layer 16 and the pad 14 are independent units, but they may be integrally formed. The metal core 15 is made of magnesium by die-casting. The layer 16 is also made of polyurethane foam. The metal core is fixed to a boss 33, and the steering wheel 11 may be transported as an assembly prior to installation.

An accommodation space 19, which is surrounded by the layer 16 on the spoke core 15b, is defined below the pad 14. An airbag device 20 and a membrane switch (not shown) are located in the accommodation space 19. The membrane switch includes upper and lower membranes, which form a part of a horn circuit. When the pad 14 is pressurized, the membranes contact one another, which activates the horn.

Figure 3B:
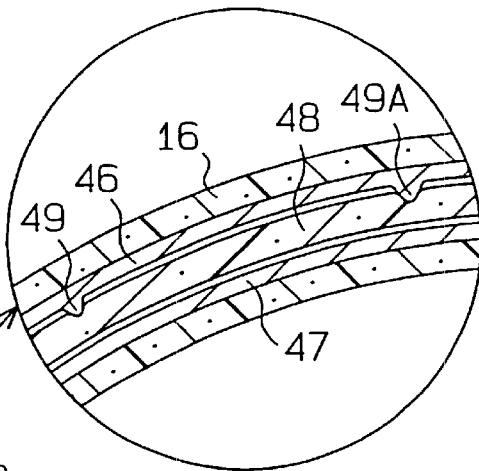
FIG. 3B is a partial enlarged view of FIG. 3A.
Figure 3A:
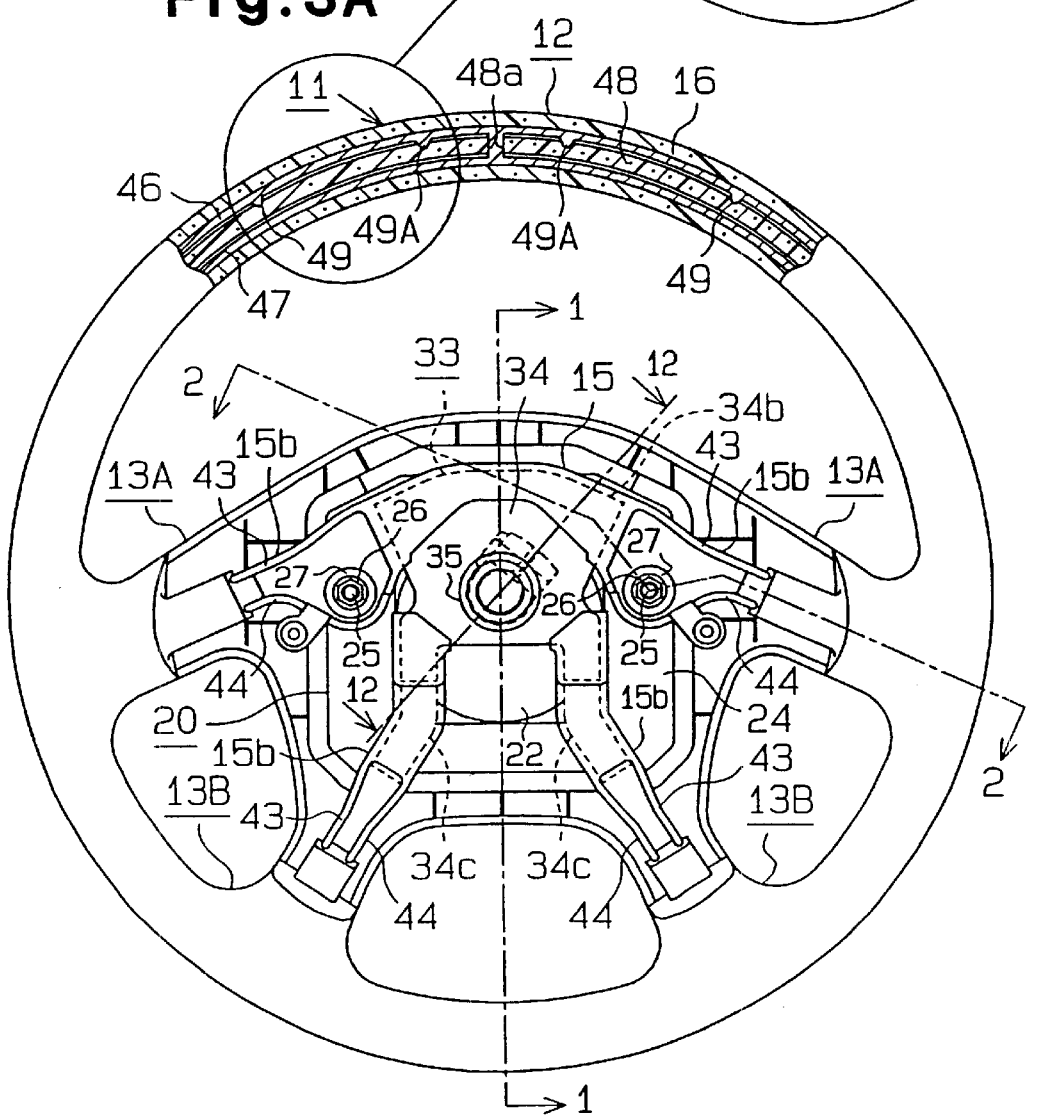
FIG. 3A is a bottom plan view of the first embodiment.

The airbag device 20 includes an airbag 21, an inflator 22, a ring retainer 23 and a bag holder 24. The air bag is folded for accommodation. The inflator 22 supplies gas to the airbag 21. The bag holder 24 holds the airbag 21, the inflator 22 and the ring retainer 23. As shown in FIG. 3A, the bag holder 24 is fixed to a pair of airbag supports 27 on the spoke core 15b by bolts 25 and nuts 26.

The installation of the steering wheel to a steering shaft 30 of the vehicle will now be described. As shown in FIG. 1, a splined portion 31 is formed on the head of a steering shaft 30. A neck 32, which is an annular groove, is formed on the splined portion 31. The position and the size of the neck 32 on the splined portion 31 may be varied, or the neck 32 may be omitted.

Figure 5:
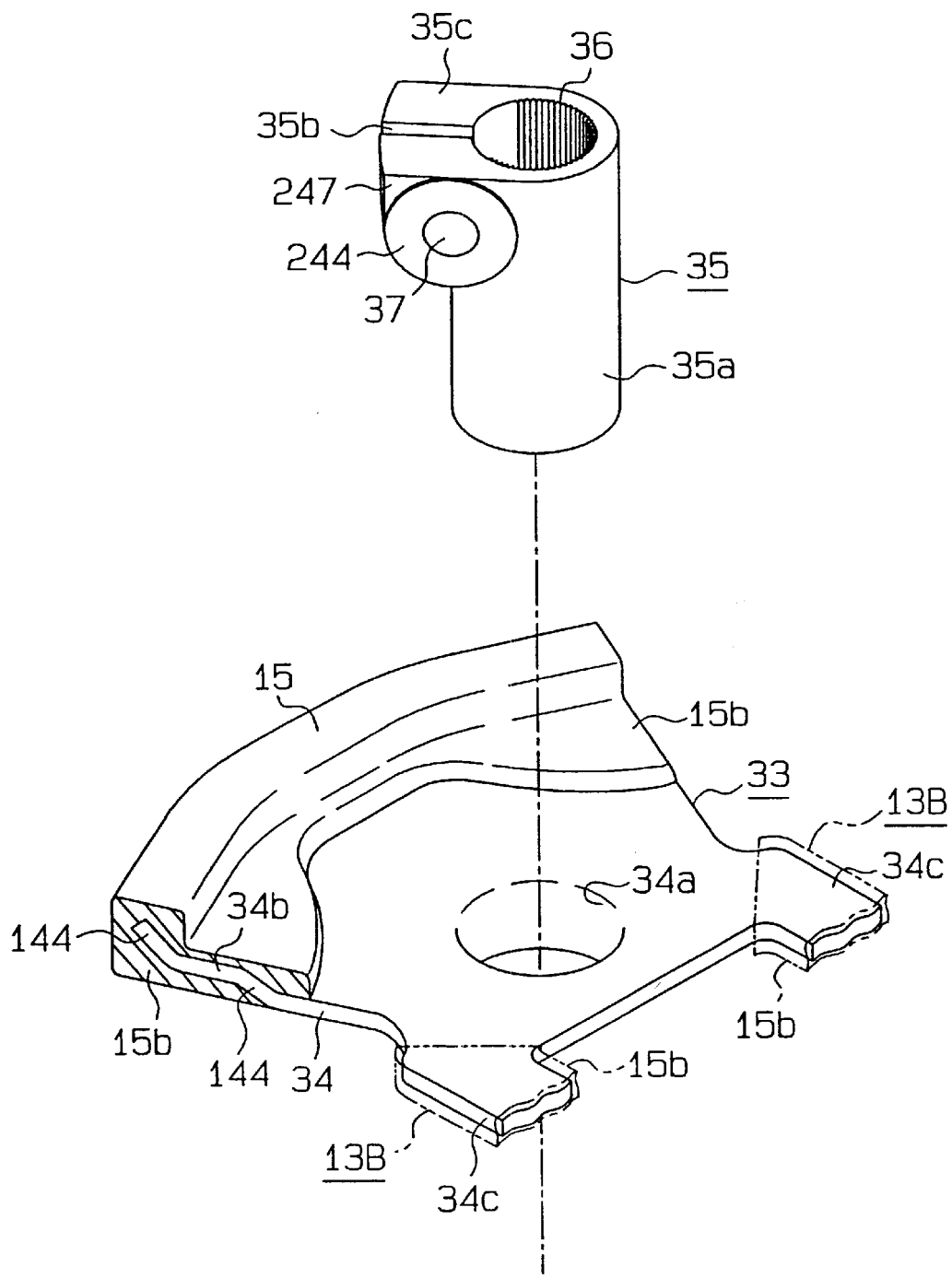
FIG. 5 is an exploded perspective view showing the structure of the boss of FIG. 1.

The boss 33 is connected to the inner end of the spoke core 15b by insert molding. As shown in FIG. 5, the boss 33 includes an iron boss plate 34 and a steel boss body 35. The boss body 35 is located in the center of the boss plate 34 and is welded to a through hole 34a. The various parts 34, 34c, 35a, 35c that form the boss 33 are made of material that includes iron as the main component.

A fan-shaped insert portion 34b is formed on the top rim of the boss plate 34. A pair of connecting portions 34c extends from the bottom of the boss plate 34. The insert portion 34b is embedded in the inner end of the spoke core 15b. The distal ends of the connecting portions 34c are embedded in the inner ends of the corresponding bottom spokes 13B.

Figure 4:
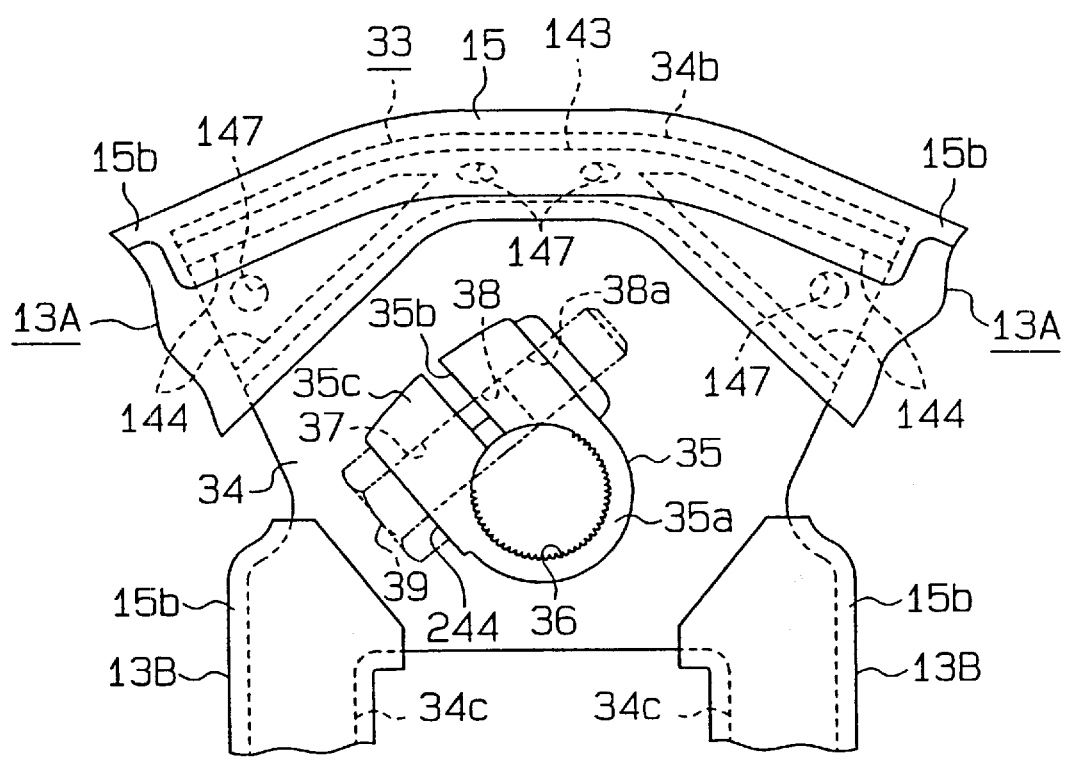
FIG. 4 is a plan view showing the yoke portion and the boss of FIG. 1.

The boss body 35 includes a cylindrical portion 35a and a C-shaped yoke portion 35c. The yoke portion 35c, which is integrally formed on the top of the cylindrical portion 35a, has a slit 35b. Splines 36, which engage with the splines 31 of the steering shaft 30, are formed on most of the inner wall of the cylindrical portion 35a as shown in FIG. 4. The splines 36 may also be formed on the entire inner wall of the cylindrical portion 35a. Instead of the splines 31, 36 of the cylindrical portion 35a and the steering shaft 30, a key and a key way may be formed on the cylindrical portion 35a and the steering shaft 30, so that relative rotation of the cylindrical portion 35a to the steering shaft 30 is prevented. As shown in FIG. 4, bolt holes 37, 38 are formed in both ends of the yoke portion 35c. An inner thread 38a is formed in one bolt hole 38.

When the steering wheel 11 is installed on the steering shaft 30, the cylindrical portion 35a of the boss body 35 is engaged with the end of the steering shaft 30. The splines 31, 36 engage with each other. In this state, as shown in FIG. 1 and FIG. 4, a bolt 39 is inserted into the bolt holes 37, 38 and threaded to the inner thread 38a. As a result, the yoke portion 35c is tightened, so that the rotation of the steering wheel 11 with respect to the steering shaft 30 is prevented. Further, the shaft of the bolt 39 engages with the neck 32 of the steering shaft 30, which prevents axial movement of the steering wheel 11 with respect to the steering shaft 30.

Also, as shown in FIG. 1, a lower cover, which is made of synthetic resin, is provided under the steering wheel 11 to cover the steering shaft 30.

The features of the first embodiment will now be described. As shown in FIGS. 2, 3, 7, 8, the spoke core 15b of the front spoke 13A and the rear spoke 13B has a pair of ribs 43, 44. The cross section of the spokes 13A, 13B has the shape of reversed U, The ribs 43, 44 strengthen the spokes 13A, 13B above, and the weight of the steering wheel is reduced.

Figure 6:
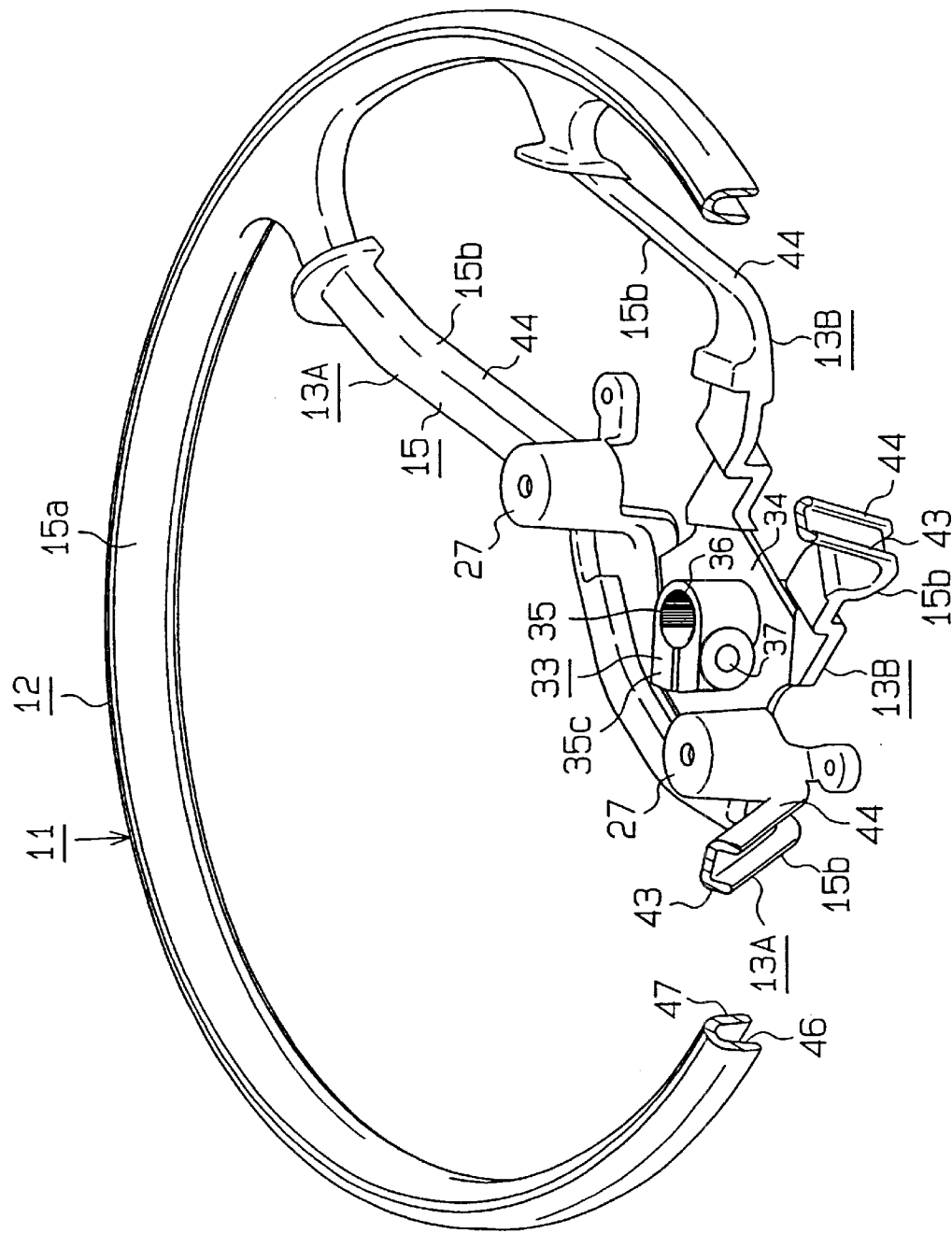
FIG. 6 is a fragmented perspective view showing metal cores and a boss of FIG. 1.
Figure 7:
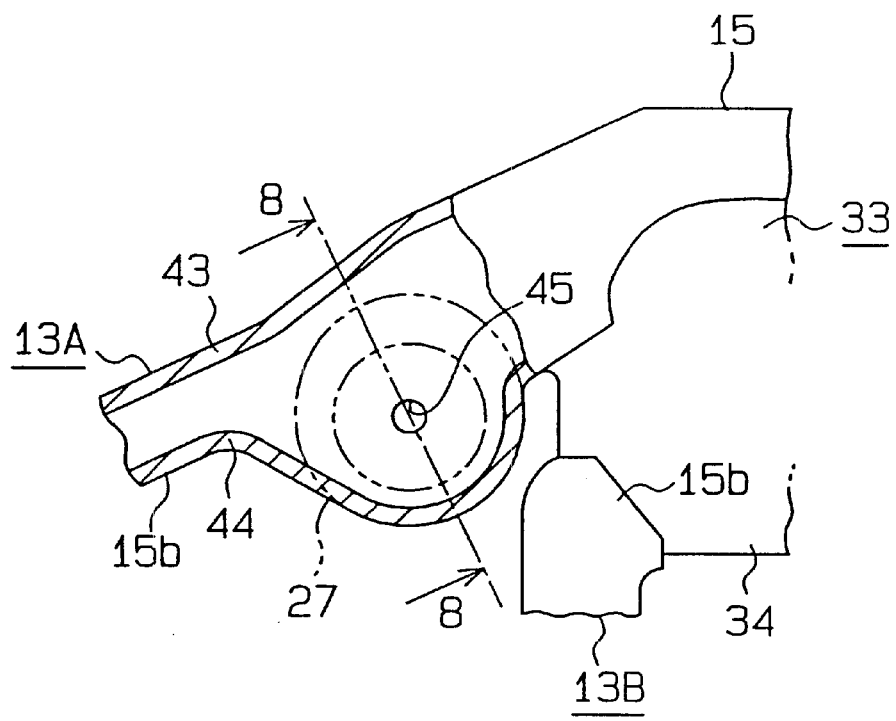
FIG. 7 is a partial cross-sectional view showing airbag supports of FIG. 6.
Figure 8:
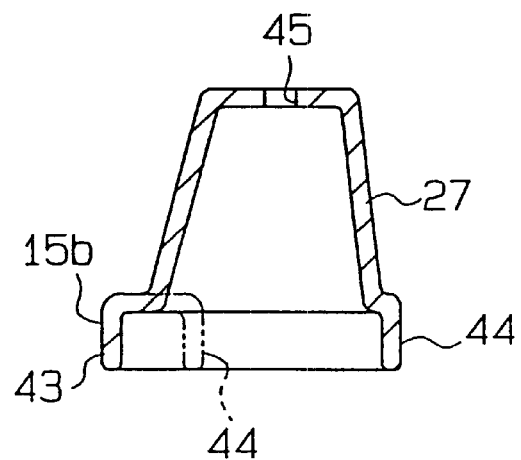
FIG. 8 is a cross-sectional view taken on line 8—8 of FIG. 7.

As shown in FIG. 6, airbag supports 27 for attaching an airbag device 20 are located at three and nine o'clock positions, respectively, of the steering wheel 11 and at opposite sides of the boss body 35. Each airbag support 27 is integrally formed with a lateral spoke 13A, and each extends axially rearward. In detail, each airbag support 27 is connected to the ribs 43, 44 on the spoke core 15b and is cup-shaped. A bolt hole 45 is formed in the center of each airbag support 27. Preferably, the airbag supports 27 are integrally formed with the spoke core 15b and one of the ribs 43, 44 as shown, however, the shape of the airbag supports 27 may be arbitrarily varied, as long as long as they are integral with the spoke core 15b.

Accordingly, each airbag support 27 is easily formed on the metal core 15 without interference with the boss 33. Since each airbag support 27 is integrally connected to the ribs 43, 44 of the spoke core 15b, the strength of the airbag supports 27 is relatively high. Accordingly, the airbag supports 27 are not easily deformed when the airbag is activated. As a result, the airbag is securely held during activation of the airbag 21 and deploys in the right direction.

Further, since the airbag supports 27 are cup-shaped, the strength of the airbag supports 27 is high. The position of the airbag 20 is easily changed by adjusting the height of the airbag supports 27 without using another supporting member such as a stay. As shown in FIGS. 1–3 and 6, the grip core 15a has a pair of ribs 46, 47 and is U-shaped. Also, as shown in FIGS. 3A and 3B, a strip-shaped charged material 48 is located between the ribs 46, 47 of the grip core 15a. The strip material 48 is made of polyethylene foam, which has a smaller specific gravity than polyurethane foam of the layer 16. The grip 12 is formed by covering the grip core 15a and the strip material 48 with the layer 16. This reduces the weight of the steering wheel 11.

Projections 49 (See FIG. 3B) are formed on the inner surface of the rib 46 of the grip core 15a at arbitrary intervals. The projections 49 maybe formed only on the rib 47 or on both ribs 46, 47. The strip material 48 is securely held between the ribs 46 and 47 by the projections 49. As shown in FIG. 3A, among the projections 49, a pair of projections 49A located at both ends of the strip material 48a is larger than the other projections 49. The ends 48a of the strip material 48 are more strongly held by the pair of projections 49A.

As shown in FIG. 1, each connecting portion 34c includes a bend 148. FIG. 1 illustrates two adjacent ends, each bent at 90 degrees to form a step. The connecting portion 34c and the bend 148 form a deformable portion. The deformable portions are preferably located below the steering shaft 30 but may be located in other positions. The bolt holes 37, 38 of the yoke portion 35c are located toward the top of the vehicle relative to the center of the grip core 15a.

Accordingly, the bolt 39 is located on the top side of the steering shaft 30.

Figure 9:
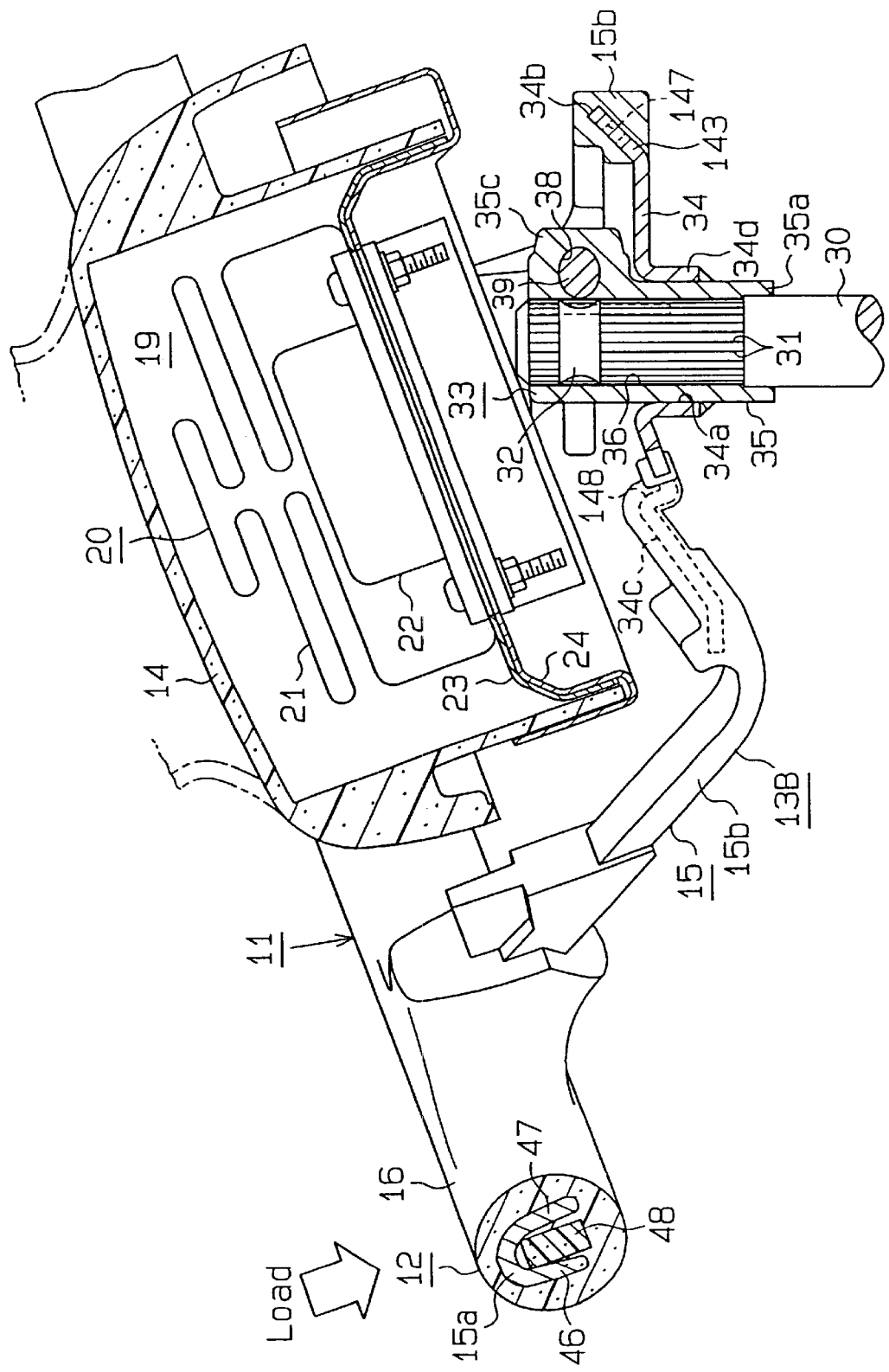
FIG. 9 is a cross-sectional view showing deformation when a load is applied to the steering wheel of FIG. 1.

As shown in FIGS. 4 and 9, an inclined portion 143 is formed in the center of the insert portion 34b of the boss plate 34. The inclined portion 143 is inclined rearwardly in the axial direction of the boss body 35. Two inclined portions 144, which have the same inclination as the inclined portion 143, are formed on the sides of the insert portion 34b in a step-like manner as shown in FIG. 5.

Figure 10:
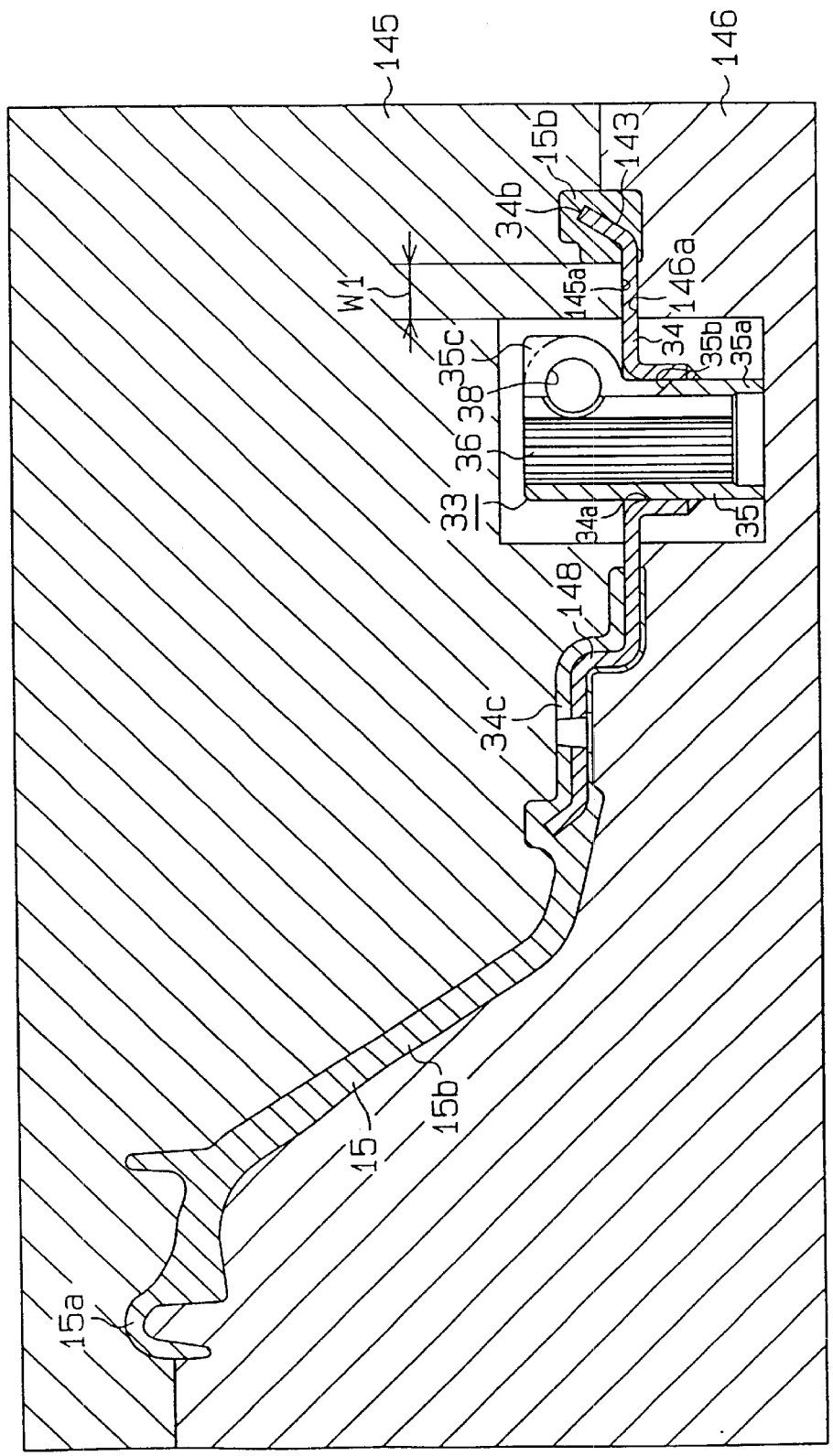
FIG. 10 is a cross-sectional view showing a mold for insert-molding a boss plate to the metal cores in the first embodiment.

As shown in FIG. 10, the spoke cores 15b of the lateral spokes 13A are molded using molds 145, 146. As a result, the spoke cores cover the inclined portions 143, 144 and are connected to the insert portion 34b of the boss plate 34. In this case, since the inclined portions 143, 144 extend toward the grip core 15a, the spoke core 15b does not project forward of the boss plate 34 when part of the spoke core 15b is formed on both the upper and lower surfaces of the insert portion 34b. Accordingly, the spoke core 15b near the insert portion 34b does not interfere with members located forward of the boss plate 34, and the position of such members is thus not limited.

Figure 11:
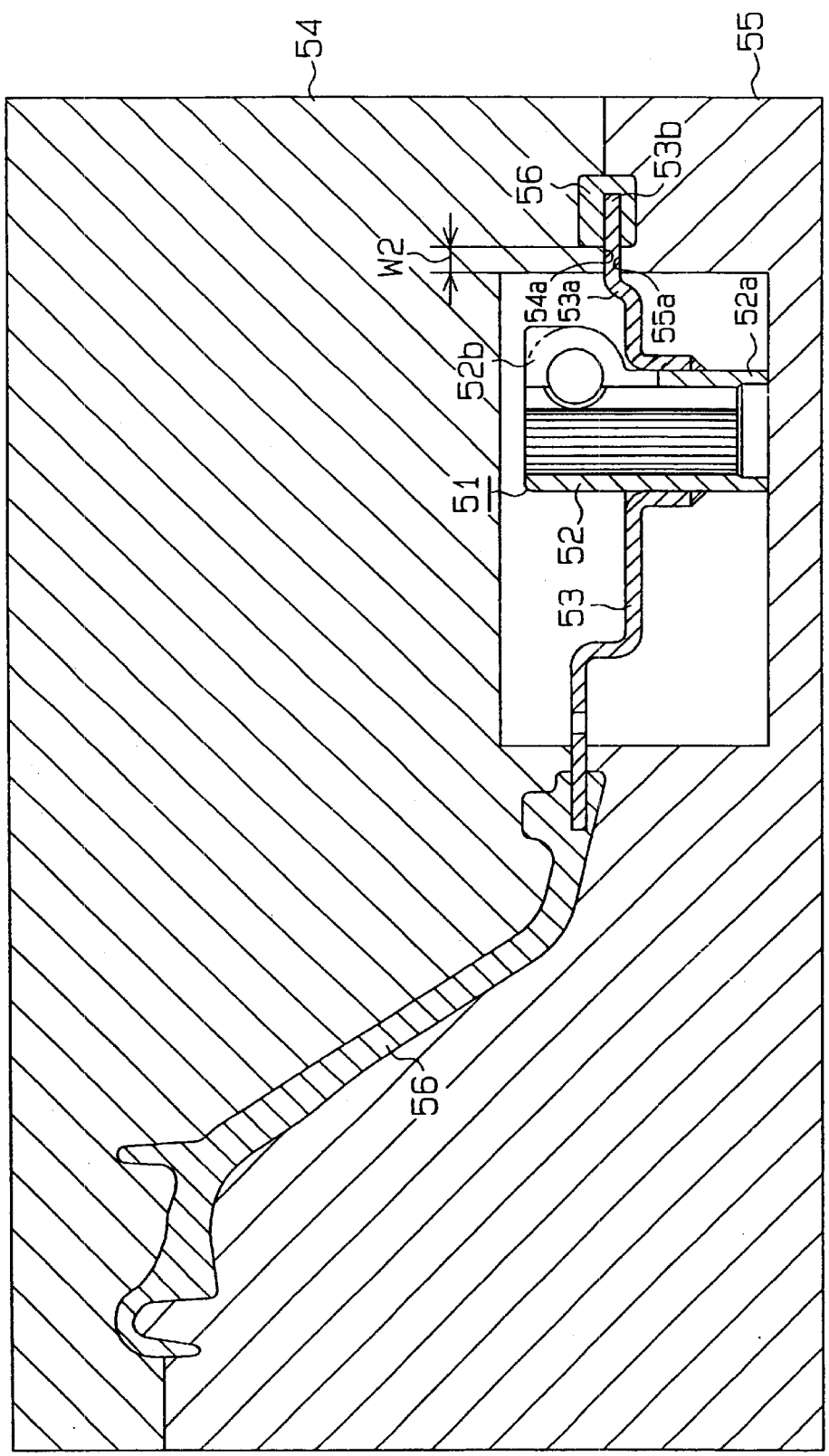
FIG. 11 is a cross-sectional view showing a mold for molding metal cores of a steering wheel.

In the first embodiment of the present invention, unlike the structure of FIG. 11, the boss plate 34 is flat without any bend near the inner margins of the molds, as shown in FIG. 10. This widens the anti-flash surfaces 145a, 146a at the inner margins of the molds 145, 146. Therefore, leakage of molten metal from the cavity of the molds 145, 146 is prevented. Thus, flash is prevented.

The inclination of the inclined portions 143, 144 is preferably set 45 degrees, but may be varied within the range of 30 to 50 degrees. The inclination means the angle of the inclined portions 143, 144 with respect to an imaginary plane extended from the boss plate 34. If the inclination angle of the inclined portions 143, 144 is too small, the spoke core 15b formed on the front side of the insert portion 34b projects too far forward of the lower surface of the boss plate 34. When the inclination of the inclined portions 143, 144 is too large, the proximal part of the inclined portions 143, 144 is sharply curved and the flat area of the boss plate 34 is reduced. As a result, the width W1 of the anti-flash surfaces 145a, 146a of the molds 145, 146 is reduced.

As shown in FIG. 4, fixing holes 147 are formed in the middle and on both sides of the insert portion 34b of the boss plate 34. Molten metal flows into the fixing holes 147 and hardens when the metal core 15 is molded using the molds 145, 146. As a result, the insert portion 34b is rigidly fixed to the inner ends of the spoke core 15b.

Figure 12:
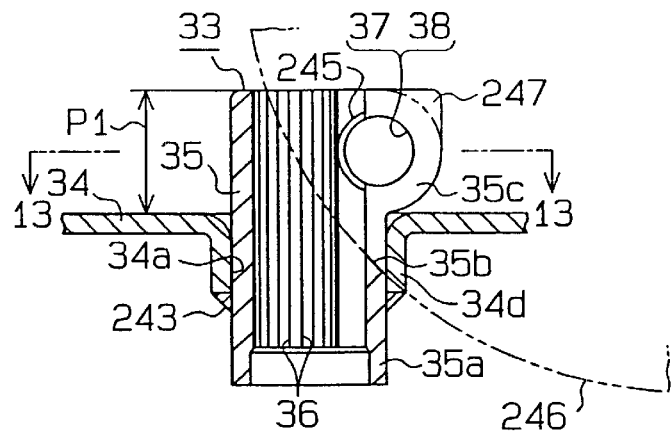
FIG. 12 is a partial cross-sectional view taken on line 12—12 of FIG. 3.

A further characteristic of the first embodiment will now be described. As shown in FIG. 12, the cylindrical portion 35a of the boss body 35 is fitted in the through hole 34a. The length of the cylindrical portion 35a of the boss body 35 is longer than that of a cylindrical portion 34d of the boss plate 33, and the cylindrical portion 35 thus projects from the cylindrical portion 34d. The cylindrical portion 35a is welded with a welding bead 243 along the lower end of the through hole 34a. Therefore, the projecting length P1 of the boss body 35 rearward of the boss plate 34 (towards the airbag) is relatively small (compare to FIG. 14, which shows the prior art). Accordingly, as shown in FIG. 1, the airbag device 20 can be positioned closer to the rear surface of the boss plate 34. This reduces the rearward projection of the airbag 20 (toward the driver).

In the embodiment of FIG. 12, the size of the steering wheel can be made more compact and the boss body 35 is rigidly fixed to the boss plate 34 without strain caused by welding. The slit 35b of the boss body 35 extends from the top of the yoke portion 35c to the middle of the through hole 34a without reaching the welding bead 243. Accordingly, strain caused by welding is prevented since the slit 35b does not overlap the welding bead 243. Also, since axial length of the slit 35b is long enough for the yoke portion 35c to easily flex, the steering wheel 11 is firmly secured to the steering shaft 30.

Figure 14:
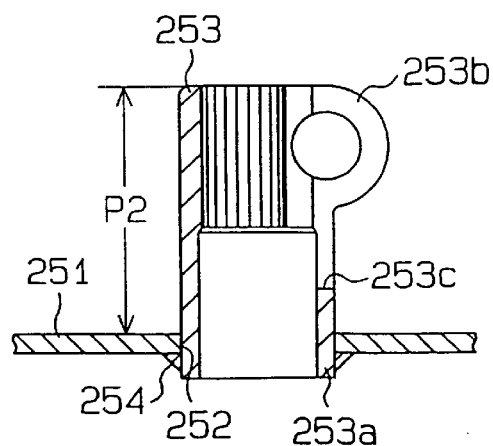
FIG. 14 is a cross-sectional view showing the structure of a prior art boss.

Further, the inner splines 36 of the boss body 35 extend axially from the rear end of the boss body 35 beyond the front end of the slit 35b. Accordingly, when the bolt 39 is tightened, the splines 36 of the boss body 35 engage with the splines 31 on the steering shaft 30 along a relatively long axial distance. As shown in FIG. 14, unlike the prior art where the inner splines of the boss body are short, chattering of the steering wheel 11 with respect to the steering shaft 30 is prevented.

Figure 13:
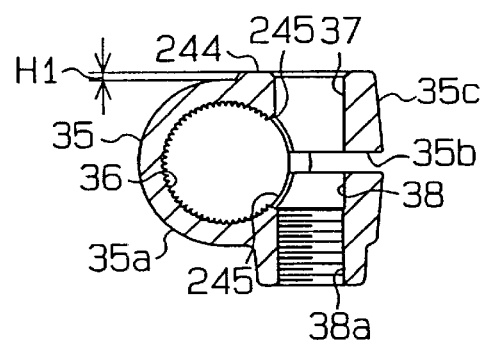
FIG. 13 is a cross-sectional view taken on line 13—13 of FIG. 12.

As shown in FIG. 13, a connecting seat 244 for the bolt 39 is formed on the yoke 35c of the boss body 35. The connecting seat 244 has a predetermined axial length H1. When the connecting seat 244 is ground perpendicularly with respect to the axis of the bolt holes 37, 38, excessive grinding of the connecting seat is prevented. Thus, the connecting seat is prevented from becoming recessed and weakened from excessive grinding.

As shown in FIGS. 12 and 13, at the intersection of the bolt holes 37, 38 and the cylindrical portion 35a is chamfered, so that a chamfered surface 245 is formed. When the inner surface of the cylindrical portion 35a is broached to form the splines 31, production of burrs is prevented due to the chamfer. Therefore, incomplete engagement of the splines 31, 36 caused by burrs is prevented.

As shown in FIG. 13, the lower end of the slit 35b of the boss body 35 has a curved surface, which corresponds to the shape of a disc-type saw 246 that is used to form the slit 35b. Therefore, the time spent for making the slit 35b is shortened.

As shown in FIGS. 5 and 12, a grasp corner 247 is formed to project from the top of the yoke portion 35c of the boss body 35. Therefore, when the steering wheel 11 is being assembled, the arm of a work robot can securely grasp the boss body 35 from both sides and can carry it to the assembling position.

The advantages of the steering wheel of FIG. 1 are as follows.

The airbag supports 27 for attaching the airbag device 20 are easily formed on the metal core 15 without interfering with the boss 33, which is in the center of the metal core 15. Since the airbag supports 27 have a predetermined strength, the airbag supports 27 do not deform and rigidly support the airbag device 20. Therefore, the airbag 21 deploys in the proper direction.

Since the airbag supports 27 are cup-shaped, the axial position of the airbag device 20 on the metal core 15 is easily varied by adjusting the height of the airbag supports 27 without using a stay.

Since the grip core 15a and the spoke core 15b are made of die cast magnesium, the weight of the steering wheel is reduced and productivity is improved.

The deformable portion is formed in the middle of the connecting portion 34c by providing the bend 148. Therefore, when a predetermined load is applied to the steering wheel 11, the connecting portion 34c is deformed at the bend 148 as shown in FIG. 9, though the spoke core 15b is made of rigid magnesium. This absorbs energy applied to the connecting portion 34c. Accordingly, the metal core 15a, 15b is made lighter and energy absorption at the connecting portion 34c is achieved. Since the main component of the connecting portion 34c is iron, the connecting portion 34c will deform.

Since the deformable portion is provided on the connecting portion 34c, which is located below the axis of the steering wheel, energy directed toward the driver in a collision is absorbed at the connecting portion 34c. Further, the bolt 39 of the yoke portion 35c is located in the top side of the steering shaft, so the steering wheel can incline as shown in FIG. 9 without interference with the yoke 35e. Accordingly, a large degree of freedom for the connecting portion 34c to deform is ensured since the bolt 39 does not interfere. This arrangement was chosen because, in a collision, a force is generally applied to the steering wheel 11 from the lower side (the six o'clock side). Therefore, energy is effectively absorbed by the connecting portion 34c.

Further, changing the thickness of the spoke core 15b that covers the bend 148 varies the deformation load of the bend 148.

The inclined portions 143, 144 are formed on the insert portion 34b of the boss plate 34. When the metal core 15 is formed on the upper and lower surfaces of the insert portion 34b, the metal core is prevented from greatly projecting forward from the lower surface of the boss plate 34. Accordingly, the lower part of the spoke core 15b does not interfere with the attachment of the lower cover 40 and the location of members on the lower side of the boss plate 34 is not limited. Since a bend is not formed on the boss plate 34, the anti-flash surface 145a, 146a is wide (dimension W1). Accordingly, when the metal core 15 is molded, flash from the inner ends of the molds 145, 146 is prevented.

The inclined portions 144 are formed on the insert portion 34b of the boss plate 34 in a step like manner. Therefore, the metal core 15 is secured to the boss plate 34 by forming the metal core 15 on the upper and lower sides of the insert portion 34b having the inclined portions 144.

Further, the fixing holes 147 for receiving molten metal when the metal core is molded are formed in the insert portion of the boss plate 34. Therefore, the metal core 15 is secured to the boss plate 34 by hardened molten metal in the fixing holes 147 of the insert portion 34b. Since the metal core at the fixing holes 147 is thicker than surrounding parts, the stress concentration when the molten metal of the metal core is hardening is relieved.

The boss body 35 is secured to the boss plate 34 without strain from welding. Since the yoke portion 35c is flexible and easily constricts when the bolt 39 is tightened in the bolt holes 37, 38, the steering wheel 11 is firmly secured to the steering shaft-30. Further, since the projection of the boss body 35 forward of the boss plate 34 is limited, the size of the steering wheel 11 is reduced.

Further, the splines 31, 36 engage with each other along a relatively long axial distance. Accordingly, the steering wheel 11 is secured to the steering shaft 30 without chattering.

(Second Embodiment)

A second embodiment of the present invention will now be described in reference to FIGS. 15–23.

To avoid a redundant description, like or same reference numerals are given to those components that are the same as the corresponding components of the first embodiment.

Figure 15:
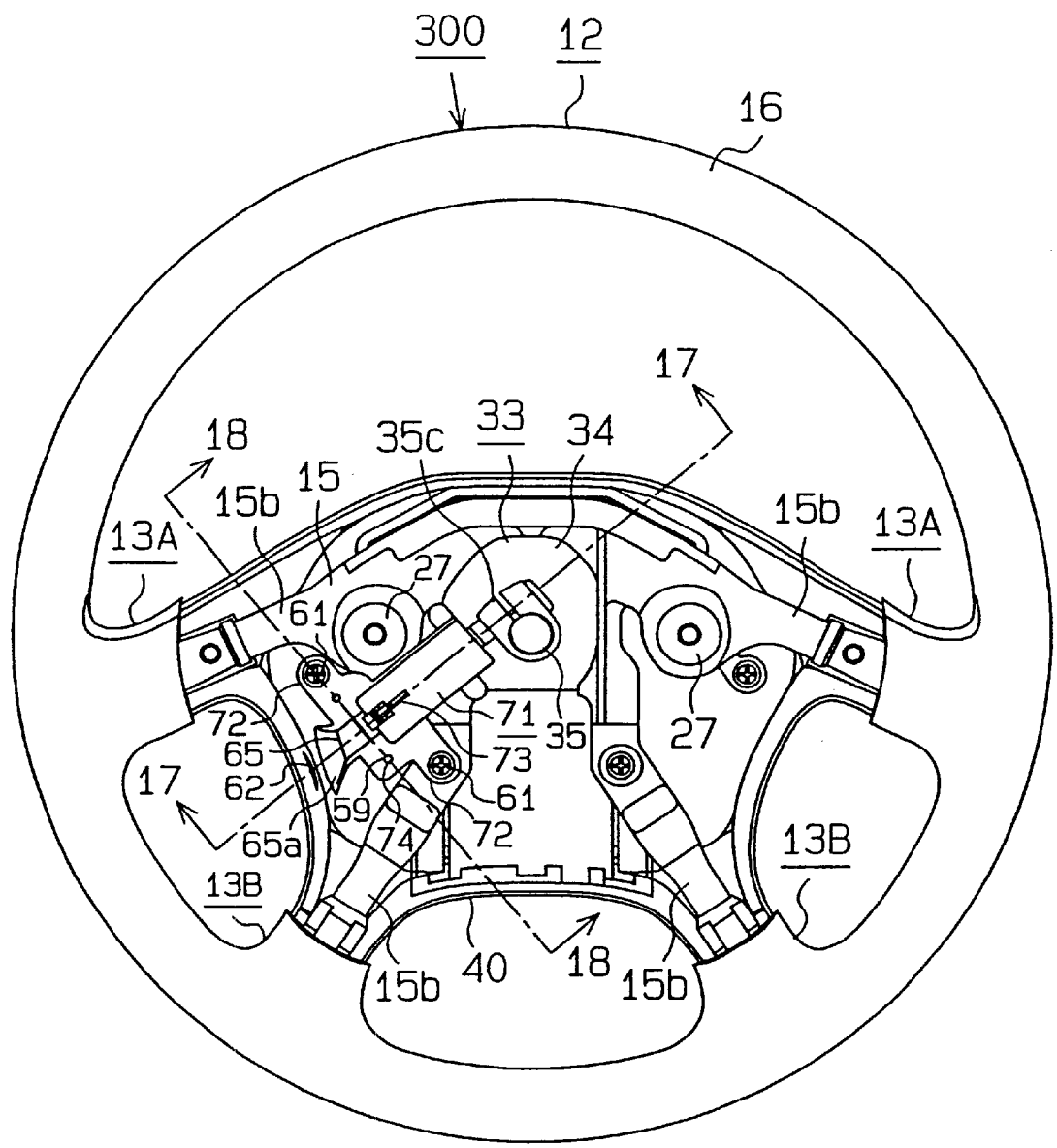
FIG. 15 is a plan view of a steering wheel according to a second embodiment of the present invention.
Figure 16:
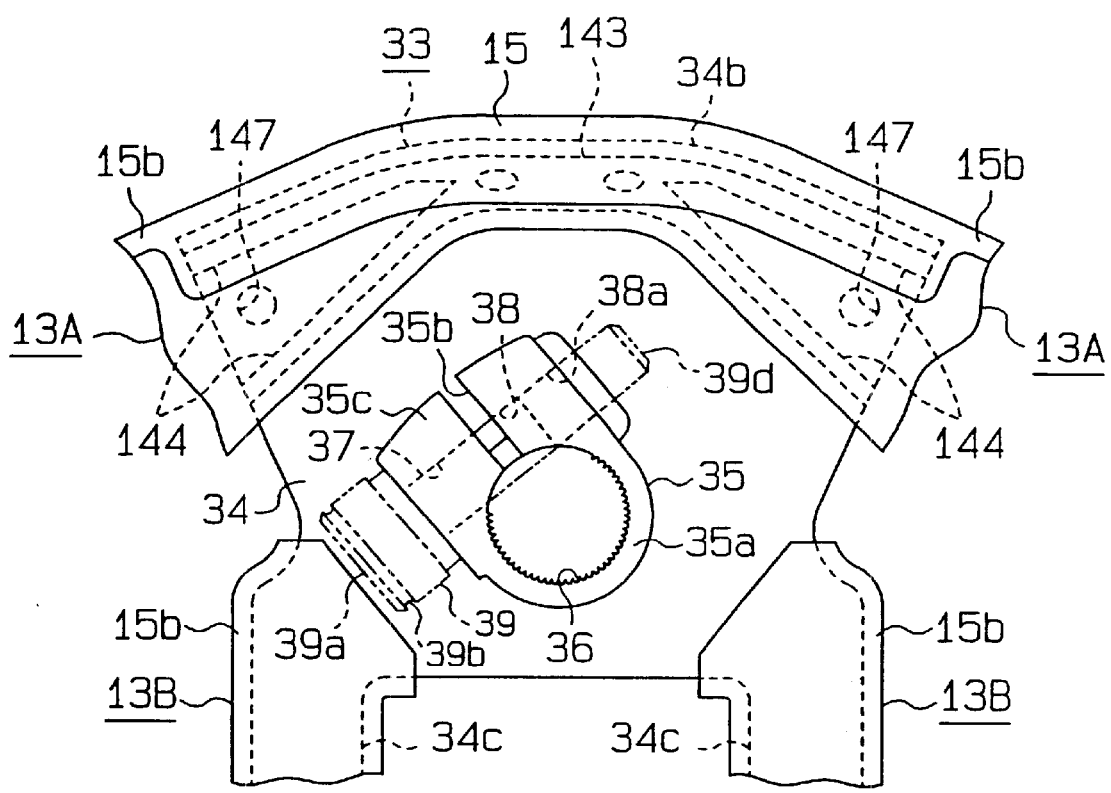
FIG. 16 is an enlarged plan view showing the yoke portion and the boss of FIG. 15.

A steering wheel 300 of the second embodiment facilitates the installation of the steering wheel 300 to the steering shaft 30. As shown in FIG. 15, a bolt holder 71 is provided on the metal core 15 at a position corresponding to the bolt holes 37, 38 of the yoke portion 35c of the boss body 35. The bolt holder 71 is cylindrical and made of synthetic resin. The bolt holder 71 includes a pair of the attaching plates 72 on its sides and a grip 73 on its top. Each attaching plate 72 has a positioning hole 74 in its middle and a bolt hole 57 at its distal portion.

Figure 18:
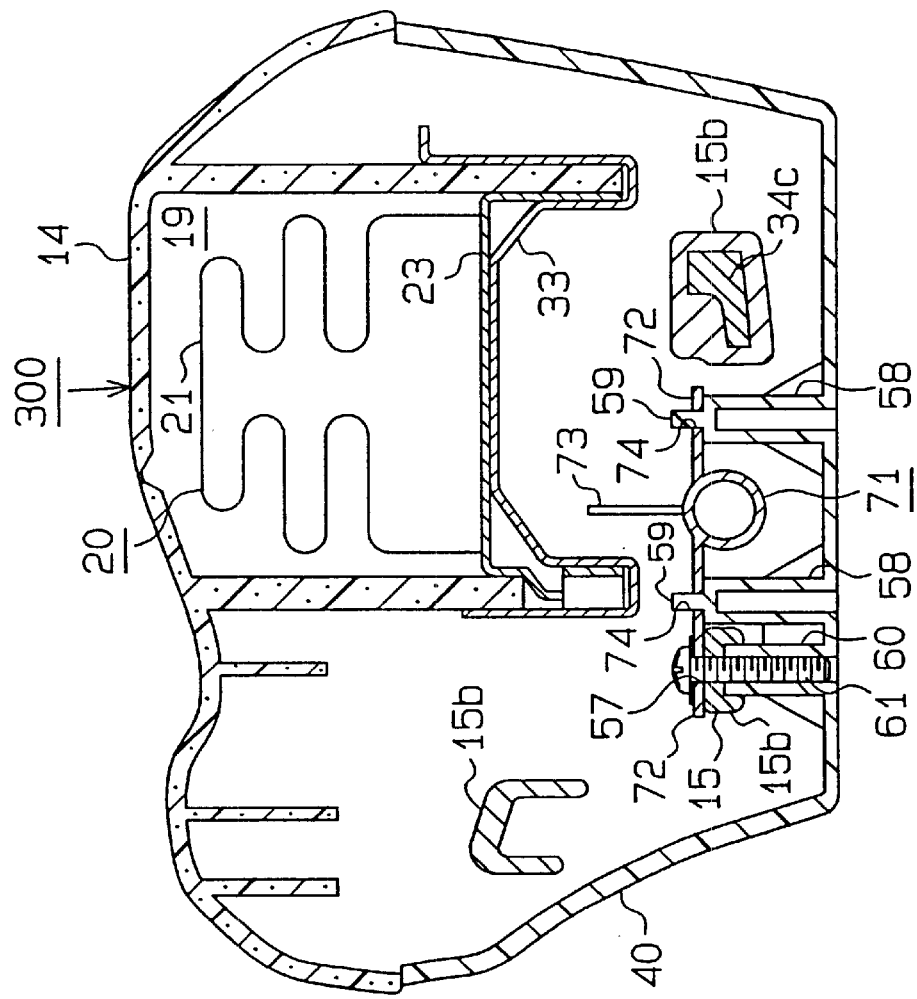
FIG. 18 is an enlarged cross-sectional view taken on line 18—18 of FIG. 15.

As shown in FIG. 18, a pair of support bosses 58 project upward from the bottom of the lower cover 40. A positioning projection 59 is formed on each support boss 58. A pair of fastening bosses 60 project from the bottom of the lower cover 40 adjacent to each support boss 58. A screw 61 is screwed in each fastening boss 60 from the bolt hole 72 of the attaching plate 72 through the spoke core 15b while the positioning hole 74 of the attaching plate 72 engaged with the positioning projection 59 of the support boss 58. This fixes the bolt holder 71 to the lower cover 40 on the metal core 15.

Figure 17:
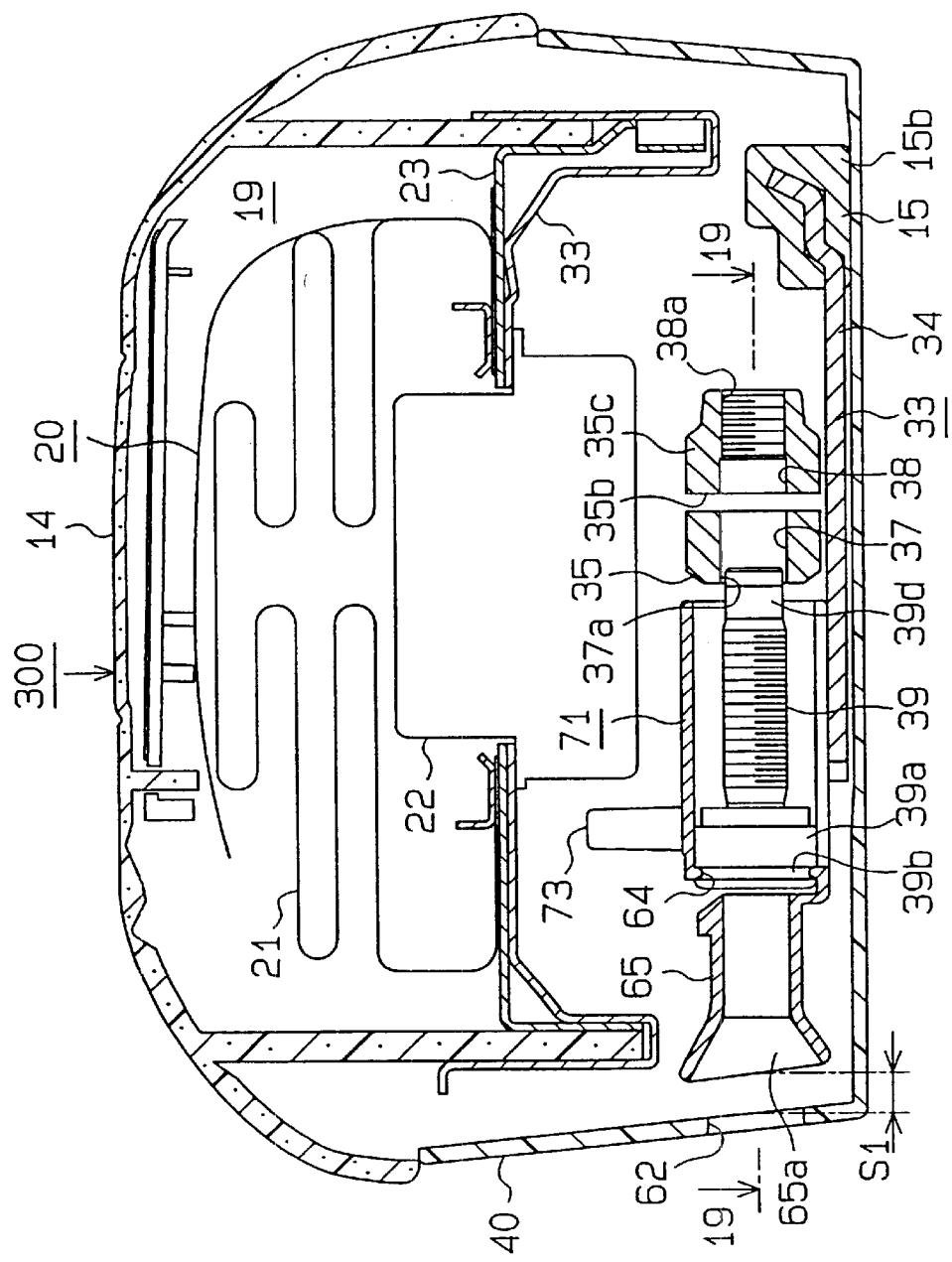
FIG. 17 is an enlarged cross-sectional view taken on line 17—17 of FIG. 15.

As shown in FIG. 17, a hole 62 is formed in the side wall of the lower cover 40 at the position corresponding to the bolt holder 71. When the bolt holder 71 is installed on the metal core 15, the hole 62, the bolt holder 71 and the bolt holes 37, 38 are aligned on the same axis. When installing the bolt holder 71, the worker positions the bolt holder 71 to the right position by holding the grip 73.

Figure 19:
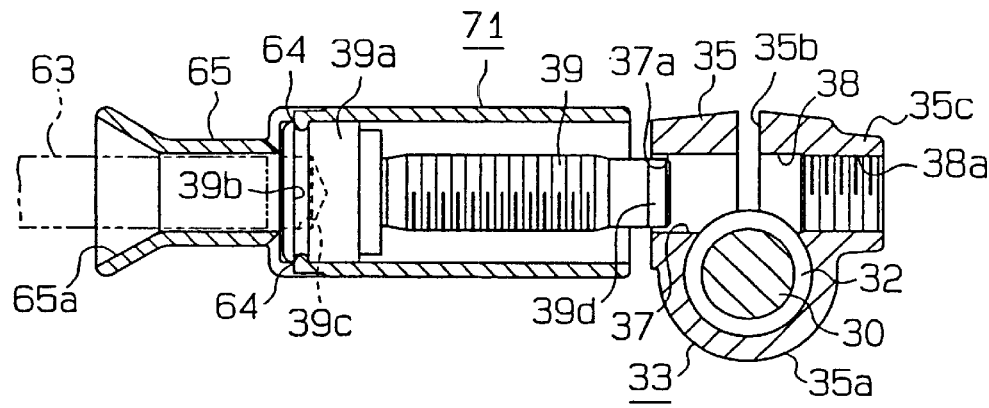
FIG. 19 is an enlarged cross-sectional view taken on line 19—19 of FIG. 17.
Figure 20:
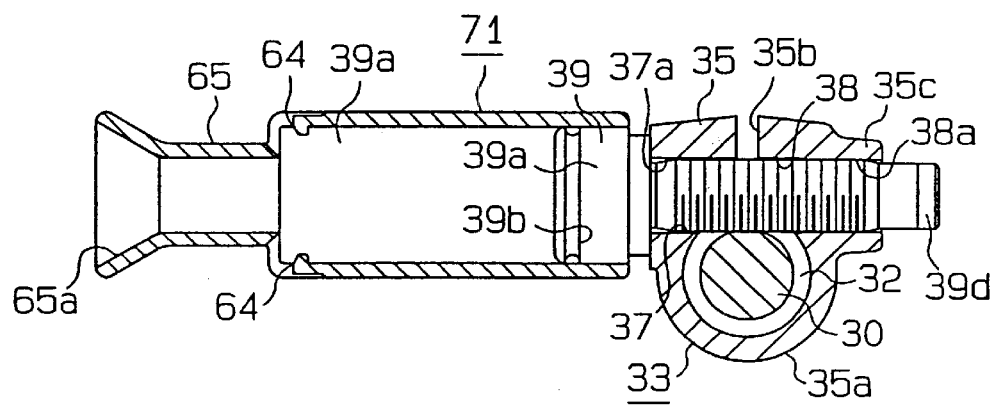
FIG. 20 is a cross-sectional view showing the bolt of FIG. 19 when tightened.

As shown in FIG. 19, the bolt 39, which is to be bolted in the bolt holes 37, 38 of the boss body 35, is accommodated in the bolt holder 71 in advance. An annular engaging groove 39b is formed on the circumferential surface of the head 39a of the bolt 39. A recess 39c for engaging a tool, such as a hexagonal wrench, is formed in the head 39a.

On the other hand, engaging projections 64 for stopping the bolt 39 are formed on the inner surface of the bolt holder 71. The engaging projections 64 engage the engaging groove 39b of the bolt 39, and the bolt 39 is temporarily held at the position shown in FIGS. 17 and 19. At the position, the distal end 39d of the bolt 39 is located in an entrance 37a of the bolt hole 37 without reaching the neck 32 of the steering shaft 30.

A guide cylinder 65 is integrally formed with the bolt holder 71 at one end of the bolt holder 71. The guide cylinder has an inner diameter greater than that of a tool 63. The guide cylinder 65 also has a flared opening 65a. As shown in FIG. 17, a predetermined space S1 is formed between the end of the opening 65a of the guide cylinder 65 and the hole 62 of the lower cover 40. The space S1 is produced when the distal end 39d of the bolt 39 enters into the opening 37a of the bolt hole 37 when installing the bolt holder 71 on the metal core 15 in the lower cover 40.

A worker can easily insert the tool 63 into the guide cylinder 65 through the hole 62 of the lower cover 40 and the opening 65a. The tool 63 is guided by the guide cylinder 65 and is easily engaged with-the recess 39c on the head 39a of the bolt 39.

When the worker presses the bolt 39 toward the boss body 35 with the tool 63, the engaging groove 39b of the bolt 39 is released from the engaging projection 64 of the bolt holder. Then, the bolt 39 moves into the bolt holes 37, 38. When the worker rotates the bolt 39 by the tool 63, the threaded portion of the bolt 39 engages with the neck 32 of the steering shaft 30 and is screwed to the inner thread 38a of the bolt hole 38. As a result, the steering wheel 300 is fixed to the steering shaft 30 through the boss body 35.

Figure 21:
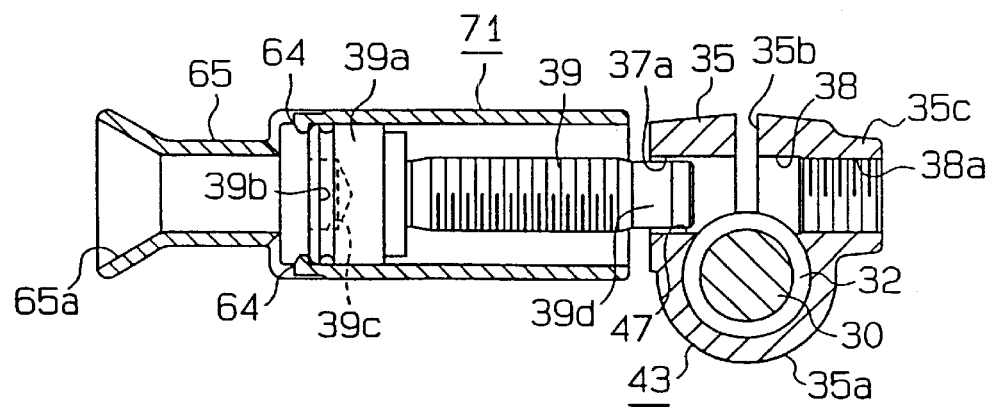
FIG. 21 is a cross-sectional view showing the bolt of FIG. 20 when unfastened.

Further, when the bolt 39 is unscrewed for maintenance, as shown in FIG. 21, the top surface of the head 39a of the bolt 39 contacts the engaging projection 64 in the bolt holder 71, and the bolt 39 is held near the first engaged position of FIG. 19. The distance between the engaging projection 64 and the neck 32 of the steering shaft 30 is set such that the distal end 39d is located in the entrance 37a of the bolt hole 37 when the bolt 39 is retracted.

Figure 22:
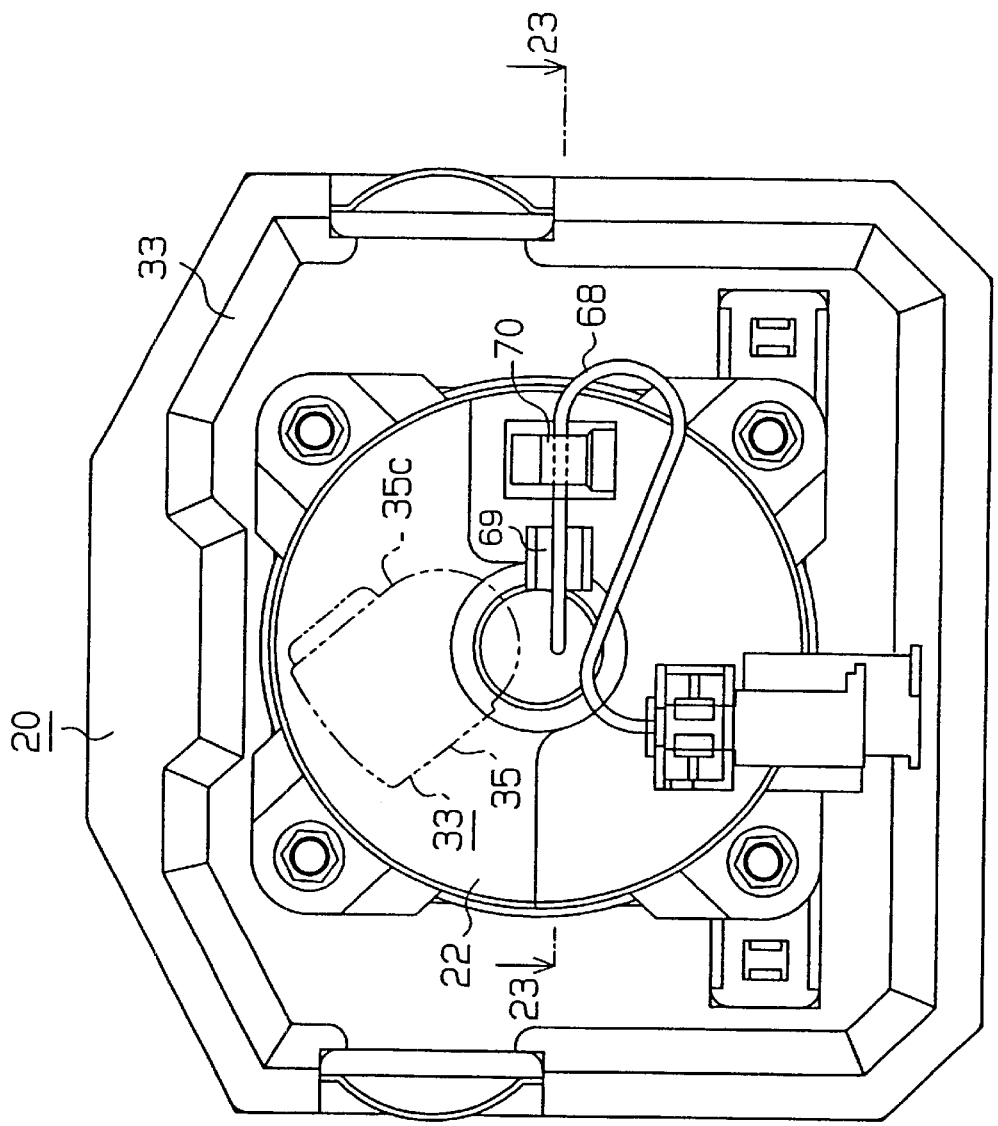
FIG. 22 is a bottom plan view of an airbag device of the second embodiment.
Figure 23:
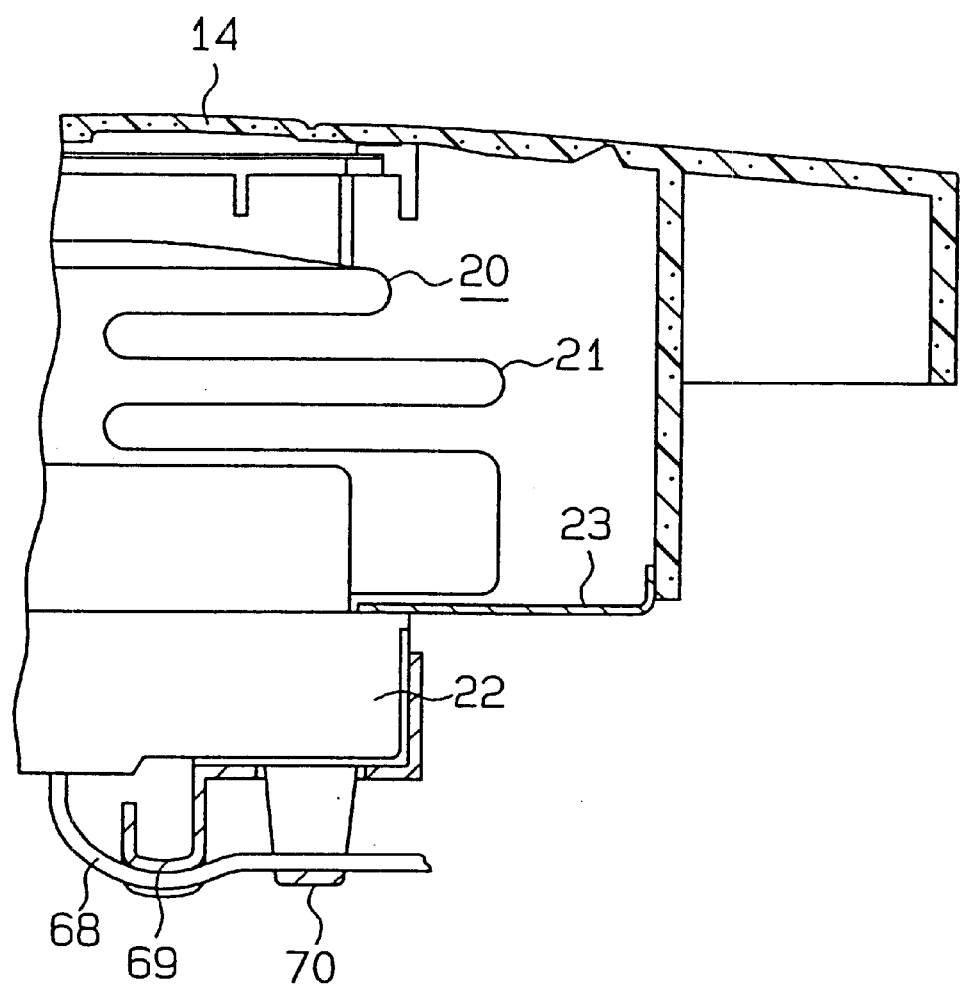
FIG. 23 is a partial cross-sectional view taken on line 23—23 of FIG. 22.

As shown in FIGS. 22 and 23, a harness 68 extends from the front of the inflator 22 of the airbag device 20. A mounting plate 69 for mounting the harness 68 and a hook for holding the harness 68 are fastened on the front of the inflator 22. The harness 68 is mounted on the mounting plate 69 and is held by the hook 70. This holds the harness to one side. As a result, when the airbag device 20 is installed on the airbag supports 27 of the metal core 15, the harness 68 does not interfere with the yoke portion 35c.

The advantages of the second embodiment are as follows.

The bolt holder 71 is located on the metal core 15 to align with the bolt holes 37, 38 of the yoke portion 35c. The bolt holder 71 retains the bolt 39 prior to use. In this initial position, the distal end 39d of the bolt 39 does not reach the neck 32 of the steering shaft 30 and is located in the entrance 37a of the bolt hole 37.

Accordingly, a worker can easily install the steering wheel 300 by screwing the bolt 39 into the bolt holes 37, 38 using the tool 63. Since the bolt 39 is held by the bolt holder 71 in advance, the worker need not align the bolt 39 with the bolt holes 37, 38 while simultaneously using the tool 63. As a result, the bolt 39 is easily and quickly fastened using one hand.

The bolt holder 71 is substantially cylindrical. The engaging projection 64 is formed on the inner surface of the bolt holder 71. The engaging projection 64 engages with the engaging groove 39b, which is located on the head 39a of the bolt 39, and holds the bolt 39 at the initial position. Accordingly, the bolt 39 is securely held in the initial position with its distal end 39d inserted in the entrance 37a of the bolt hole 37. As a result, the bolt is firmly retained when the steering wheel 300 is carried.

Further, when the bolt 39 is unscrewed from the bolt holes 37, 38 for maintenance, the head 39a of the bolt 39 contacts the engaging projection 64. This prevents the bolt 39 from coming out and the bolt 39 is held near the initial position in the bolt holder 79. As a result, after the maintenance, the bolt 39 is easily refastened.

The guide cylinder 65 is provided on the proximal end of the bolt holder 71. The guide cylinder 65 guides the tool 63 to the head 39a of the bolt 39. The guide cylinder 65 enables the worker to easily insert the tool 63 in the bolt holder 71 and to engage the tool 63 with the head 39a of the bolt 39. As a result, the bolt 39 is quickly fastened.

In addition, the proximal end of the guide cylinder 65 includes a flared opening 65a. When the space S1 is formed between the hole 62 for the tool 63 and the proximal end of the guide cylinder 65, the worker can easily insert the tool 63 in the guide cylinder 63 along the opening 65a. Thus, the bolt 39 is more quickly bolted.

The second embodiment may be varied as follows.

The bolt holder 71 may be arranged so as to occupy the space S1 between the hole 62 and the guide cylinder 65. In this case, the bolt holder 71 includes a first engaging projection 64, which engages with the engaging groove 39b, and a second engaging projection (not shown), which is axially spaced from the first engaging projection 64. When the bolt 39 is engaged with the first engaging projection 64, the bolt holder 71 completely accommodates the bolt 39. In this case, the bolt holder 71 is installed on the metal core 15 in the lower cover 40, by the engagement of the engaging groove 39b with the first engaging projection, with the distal end 39d of the bolt 39 completely accommodated in the bolt holder 71. The bolt holder is arranged so as to occupy the space between the guide cylinder 65 and the hole 62. Then, the first engaging projection 64 releases the engaging groove 39b when the worker presses the bolt 39 toward the boss body 35 using the tool 63. Then, the second engaging projection engages the engaging groove 39b. This holds the bolt 39 in the initial position with the distal end 39d of bolt 39 located in the entrance 37a of the bolt hole 37.

In this case, since there is no space between the hole 62 and the guide cylinder 65, the opening 65a of the guide cylinder 65 may be changed to have the same diameter as that of the hole 62. Though the shape of the guide cylinder 65 is changed, the tool 63 is easily inserted.

The shape of the bolt holder 71 and the installation structure of the bolt holder to the metal core 15 may be varied.

Instead of holding the bolt 39 in the initial position in the bolt holder 71 by the engagement of the engaging groove 39b with the engaging projection 64, the bolt 39 may be held in the initial position by friction between the inner wall of the bolt holder 71 and the circumferential surface of the head 39a of the bolt 39.

Therefore, the present examples and embodiments are to be considered as illustrative and not restrictive and the invention is not to be limited to the details given herein, but may be modified within the scope and equivalence of the appended claims.

What is claimed is:

1. A steering wheel connected to a distal end of steering shaft with a boss, the steering wheel having a grip for rotating the steering shaft, the steering wheel comprising:

a plurality of spokes that extend from the grip;

a cylindrical portion, which is part of the boss, wherein the cylindrical portion receives the distal end of the steering shaft;

a yoke integrally formed on the cylindrical portion, wherein the yoke has a pair of arms for fastening the boss to the steering shaft;

a bolt hole provided in each arm of the yoke;

a bolt occupying the bolt holes for fastening the arms of the yoke and fixing the steering wheel to the steering shaft, wherein the head of the bolt has an engaging portion;

a neck formed in the steering shaft, wherein the bolt engages the neck;

a bolt retainer for holding the bolt, the bolt retainer being axially aligned with the bolt hole, wherein the bolt retainer temporarily retains the bolt in an initial position, wherein the distal end of the bolt is spaced from the neck portion prior to installation of the steering wheel, wherein the bolt retainer is cylindrical, wherein a cooperating engaging portion is provided in the inner surface of the bolt retainer, wherein the engaging portion engages with the cooperating engaging portion to retain the bolt prior to installation, wherein when the bolt is unbolted, the bolt is blocked form falling out of the bolt retainer by the cooperating engaging portion, and wherein the distance between the cooperating engaging portion and the neck of the steering shaft is set such that the distal end of the bolt is spaced from the neck and is located in the entrance of one of the bolt holes when the head of the bolt contacts the cooperating engaging portion; and a tool guide, which is provided at one end of the bolt retainer for guiding a tool for fastening the bolt, wherein the distal end of the tool guide is trumpet-shaped.

2. The steering wheel according to claim 1, wherein the steering shaft has outer splines on its outer surface, and the cylindrical portion has inner splines on its inner surface, wherein the outer and inner splines engage with one another when the steering wheel is installed, wherein the boss plate includes a sleeve for receiving the cylindrical portion, wherein the cylindrical portion extends axially further away from distal end of the steering shaft than the sleeve, and a weld is formed for securing the cylindrical portion to an end of the sleeve, wherein the yoke is located on same side of the boss plate as the distal end of the steering shaft, wherein a slit is formed in the yoke, wherein the slit is separated in the axial direction from the weld.

3. The steering wheel according to claim 2, wherein the splines of the cylindrical portion are axially longer than the slit.

4. The steering wheel according to claim 1, wherein the boss plate includes an insert portion, which is integrally molded with a grip core and a spoke core, wherein the rim of the insert portion is inclined toward the distal end of the steering shaft at a predetermined angle.

5. The steering wheel according to claim 4, wherein a plurality of inclined portions are formed on the insert portion in a step-like manner.

6. A steering wheel connected to a distal end of a steering shaft with a boss, the steering wheel having a grip for rotating the steering shaft, the steering wheel comprising:

a plurality of spokes that extend from the grip;

a cylindrical portion, which is part of the boss, wherein the cylindrical portion receives the distal end of the steering shaft;

a yoke integrally formed on the cylindrical portion, wherein the yoke has a pair of arms for fastening the boss to the steering shaft;

a bolt hole provided in each arm of the yoke;

a bolt occupying the bolt holes for fastening the arms of the yoke and fixing the steering wheel to the steering shaft, wherein the head of the bolt has an engaging portion;

a neck formed in the steering shaft, wherein the bolt engages the neck;

a bolt retainer for holding the bolt, the bolt retainer being axially aligned with the bolt hole, wherein the bolt retainer temporarily retains the bolt in an initial position, wherein the distal end of the bolt is spaced from the neck portion prior to installation of the steering wheel, wherein the bolt retainer is cylindrical, wherein a cooperating engaging portion is provided in the inner surface of the bolt retainer, wherein the engaging portion engages with the cooperating engaging portion to retain the bolt prior to installation, wherein when the bolt is unbolted, the bolt is blocked from falling out of the bolt retainer by the cooperating engaging portion, and wherein the distance between the cooperating engaging portion and the neck of the steering shaft is set such that the distal end of the bolt is spaced from the neck and is located in the entrance of one of the bolt holes when the head of the bolt contacts the cooperating engaging portion; and a tool guide, which is provided at one end of the bolt retainer for guiding a tool for fastening the bolt, wherein the inner diameter of the tool guide is smaller than the outer diameter of a head of the bolt.

* * * * *